2,321,185

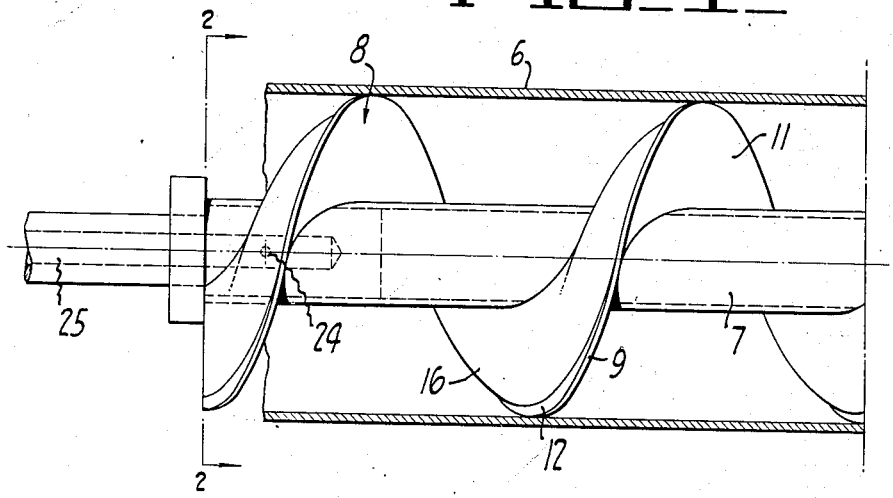
FIG_1_
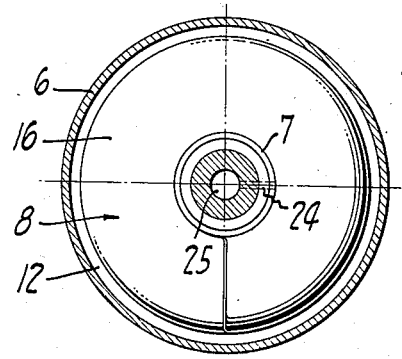
FIG_2_
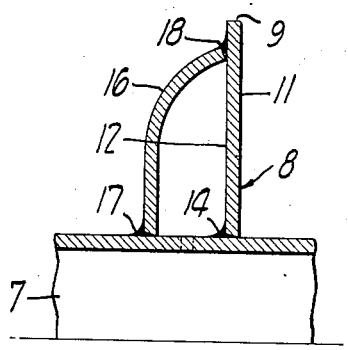
FIG_3_
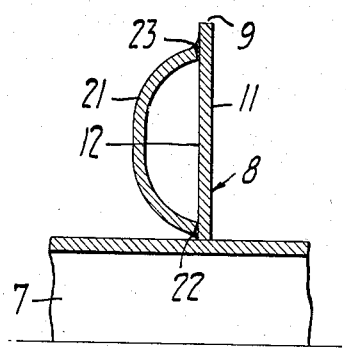
FIG_4_
INVENTOR
Joseph D. Christian
BY Robert H. Eckhoff
ATTORNEY Patented June 8, 1943

UNITED STATES PATENT OFFICE 2,321,185

HEAT EXCHANGE SCREW CONVEYER

Joseph D. Christian, San Francisco, Calif.

Application November 20, 1940, Serial No. 366,323

3 Claims. (Cl. 257—101)

This invention relates to improvements in screw conveyers, particularly one enabling the conveyer to be employed for heat exchange purposes.

The present invention contemplates provision of a helical screw cooperating with a suitable duct or housing, in the usual manner of screw conveyers, to move a mass of material through the duct upon rotation of the screw while the flight of the screw is heated or cooled by a suitable heat exchange fluid medium to raise or lower the temperature of the mass moved by the rotating screw. To accomplish this, a heat exchange fluid passage is provided on the helical conveyer flight to maintain the flight, as it rotates, at a desired temperature with a heat transfer fluid such as steam, hot or cold water or other suitable media. Heating or cooling many viscous or semi-fluid masses is far more practical in a screw conveyer than in the usual heat exchange devices. In addition, the transfer of material and its temperature conditioning can be achieved in one operation.

Screw conveyers are employed in many operations in which the entire apparatus employed must be kept very clean. For example, in the canning of various foods, the usual practice is to polish the screw conveyers so that food particles will not be retained thereon when the canning operation is discontinued, as over night. The screw conveyer of the present invention contemplates manufacture of the flight in such a way that this polishing operation is possible at relatively low cost.

Even though screw conveyers are employed as heat exchangers, their cost must be kept relatively low. Further, their maintenance cost must also be kept low. In accordance with this invention the screw conveyer heat exchange device is so manufactured that fluid heat exchange is practically independent of wear on the conveyer structure as such. Further, the conveyer heat exchange device of the present invention is so constructed that a minimum number of welding operations are employed.

The invention includes other objects and features of advantage, some of which, together with the foregoing, will appear hereinafter wherein present preferred forms of the screw conveyer-heat exchange device of the present invention are disclosed.

In the drawing accompanying and forming a part hereof

Figure 1 is a general assembly view illustrating the general organization of the screw conveyer manufactured in accordance with this invention.

Figure 2 is a cross sectional view taken along the line 2—2 of Figure 1.

Figures 3 and 4 are radial sectional views taken through screw conveyer flights embodying the present invention.

The usual screw conveyer includes an outer housing or duct indicated at 6 in which is positioned a suitably rotatably supported shaft 7 usually in the form of a hollow pipe. To this pipe is secured a helical screw generally indicated at 8. This screw extends from the pipe closely adjacent to the housing so that the wiping edge 9 on the screw is so close to the housing that the screw is effective to force material along between itself and the housing as the screw is rotated. The screw thus involves a leading face 11 which bears against and forces the material ahead of it and a following or trailing face 12. As appears in Figure 3 the screw flight is preferably secured to the pipe as by welding at 14 throughout the length thereof to provide a fluid tight joint. In accordance with this invention an arcuately formed helical member 16 is secured by welding at 17 to the pipe 7 and as by welding at 18 to the following face 12 on the helical flight. In accordance with this invention the welding at 18 at the point of juncture of the member 16 and the following face on the helical flight is adjacent to but is spaced from the trailing edge on the screw conveyer flight. Thus, wear on the screw conveyer takes place only on the wiping edge 9. It can be taken up, for example, by adjusting the size of the housing relative to the screw conveyer flight. Further, extensive wear does not result in the failure of the heat exchange ability of the screw conveyer nor permit release of the heat exchange fluid.

In Figure 4 I have shown a further modification in which an arcuately formed member 21 is secured as by welding at 22 and 23 to the trailing or following face 12 on the screw conveyer flight. In this instance, however, the arcuate member is entirely secured and carried by the screw member. Since it is possible to secure the screw flight by occasional tack welds to the standard or pipe upon which it is mounted, this reduces the number of welds and materially simplifies construction for long, fluid tight welds are expensive; in addition they may cause standard 7 to buckle. This structure can be made up in sections and suitably polished so that no food particles will be retained thereon. The several sections can then be suitably assembled, in a manner well known in the art to provide the complete screw conveyer.

Fluid inlet and egress can be through suitable openings 24 and conduits as at 25 from the pipe 7 at one or more points to the heat exchange passage provided by flight 11 and members 16 and 21.

I claim:

1. In combination, a duct, a helical screw conveyer including a shaft and a screw member thereon having a leading and a following face thereon and rotatable in said duct with the outer edge of said screw substantially wiping said duct and with the inner edge thereof abutting said shaft, said leading face extending outwardly away from said shaft substantially at 90° thereto, and presenting a substantially flat surface for maximum conveyer efficiency, and a member positioned on said screw conveyer adjacent said following face to enclose a fluid passage, a portion of said member being joined to said screw member adjacent to said wiping edge but spaced along said following face from said wiping edge.

2. In combination, a duct, a rotatable shaft member supporting a helical screw conveyer including a screw member having a leading and a following face thereon, said shaft being rotatable in said duct with the outer edge of said screw substantially wiping said duct and with the inner edge thereof abutting said shaft and sealed thereto, said leading face extending outwardly away from said standard substantially at 90° thereto, and presenting a substantially flat surface for maximum conveyer efficiency, and a member secured to said shaft and to the following face of said screw member adjacent to said wiping edge but spaced along said following face from said wiping edge to enclose a fluid passage with said shaft and said face.

3. In a device of the character described, a screw conveyer including a shaft carrying a helical screw thereon having a leading and a following face, and a member secured to said following face and carried by said face intermediate the ends thereof and enclosing a fluid passage with said face.

JOSEPH D. CHRISTIAN.